US012683990B2

(12) United States Patent
Gerashchenko et al.

(10) Patent No.: US 12,683,990 B2
(45) Date of Patent: Jul. 14, 2026

(54) DOMAIN-SPECIFIC ISSUE IDENTIFICATION AND MAPPING

(71) Applicant: SAP SE, Walldorf (DE)

(72) Inventors: Maxym Gerashchenko, Heidelberg (DE); Taras Slobodskyy, Heidelberg (DE)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 18/813,264

(22) Filed: Aug. 23, 2024

(65) Prior Publication Data

US 2026/0058962 A1 Feb. 26, 2026

(51) Int. Cl.
| | |
|---|---|
| *G06F 16/36* | (2019.01) |
| *G06F 40/284* | (2020.01) |
| *G06F 40/30* | (2020.01) |
| *G10L 15/197* | (2013.01) |
| *H04L 9/40* | (2022.01) |

(52) U.S. Cl.
CPC ........ *H04L 63/1416* (2013.01); *G06F 40/284* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 10,339,452 | B2 * | 7/2019 | Romano | G06F 16/367 |
| 12,315,496 | B2 * | 5/2025 | Mittal | G06N 5/022 |
| 2014/0201185 | A1 * | 7/2014 | Chang | G06F 16/367 |
| | | | | 707/738 |
| 2015/0106078 | A1 * | 4/2015 | Chang | G06F 16/35 |
| | | | | 704/9 |
| 2018/0173699 | A1 * | 6/2018 | Tacchi | G06F 16/358 |
| 2020/0151246 | A1 * | 5/2020 | Mwarabu | G06F 40/216 |
| 2021/0294828 | A1 * | 9/2021 | Tomkins | G06F 9/547 |
| 2021/0294970 | A1 * | 9/2021 | Bender | G06N 5/022 |
| 2023/0244875 | A1 * | 8/2023 | Venkateshwaran ... | G06F 40/289 |
| | | | | 704/9 |

* cited by examiner

*Primary Examiner* — Christopher B Robinson
(74) *Attorney, Agent, or Firm* — Buckley, Maschoff & Talwalkar LLC

(57) ABSTRACT

Systems and methods include generation of a set of n-grams of different lengths from each of a plurality of text portions, determination, for each set of n-grams, of matching topic variants of a domain ontology, determination of a topic associated with each of the matching topic variants, wherein a determined topic is associated with the text portion from which n-grams matching an associated topic variant were generated, generation of first n-grams of different lengths from a first text portion, determination, for each of a plurality of the first n-grams, of first matching topic variants of the domain ontology, determination of a first topic associated with each of the first matching topic variants, and determination of mappings between the first text portion and the plurality of text portions based on the topics associated with the plurality of text portions and the determined first topics.

13 Claims, 10 Drawing Sheets

1000

| Reqt N-gram | Matching Topic | Matching Variant | Match Probability |
|---|---|---|---|
| security policies | Topic2 | VariantE | 91% |
| policies firewall | Topic1 | VariantC | 86% |
| policies firewall | Topic1 | VariantA | 88% |
| ... | ... | ... | . |

| Control N-gram | Matching Topic | Matching Variant | Match Probability |
|---|---|---|---|
| secure policy | Topic2 | VariantE | 91% |
| firewall access | Topic1 | VariantB | 86% |
| password rules | Topic3 | VariantH | 88% |
| ... | ... | ... | . |

Compliance Application

Requirement: "Ensure that security policies and operational procedures for managing firewalls are documented, in use, and known to all affected parties."

1210

| Control_ID | Matching Topics | Matching Score | Select |
|------------|-----------------|----------------|--------|
|            |                 |                | ☐      |
|            |                 |                | ☐      |

DOMAIN-SPECIFIC ISSUE IDENTIFICATION AND MAPPING

BACKGROUND

The prevalence and sophistication of cyberattacks continues to grow. These attacks may cause significant harms, in terms of downtime costs, revealed competitive secrets, privacy violations, and legal liability. Organizations therefore require their vendors to obtain an increasing number of compliance certifications which represent a minimum acceptable security level and ability to satisfy applicable regulations.

Compliance certifications are typically associated with a set of requirements. As a first step, an organization may identify existing security controls which map to different ones of the set of requirements. Due to the complexity of the requirements, the number of existing controls and the underlying computing systems, this identification requires substantial expertise and manual effort. Conventional text analysis has been employed but has not been seen to significantly reduce these difficulties.

What is needed are systems which efficiently provide high-quality and domain-specific issue identification and mapping.

BRIEF DESCRIPTION OF THE DRAWINGS

FIG. 10 illustrates text-to-ontology mapping information according to some embodiments.

FIG. 11 illustrates control-to-ontology mapping information according to some embodiments.

FIG. 12 illustrates a user interface presenting text-to-control mapping information according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

According to some embodiments, requirements are matched to controls via a domain-specific ontology. For example, relevant strings of a requirement are each transformed to an array of n-grams. The n-grams are used to identify topics of the ontology which relate to the requirement. Associations between controls and ontology topics may be similarly determined using n-grams of relevant strings of the controls. Controls which are associated with the same ontology topics as the requirement are determined, and mappings between the requirement and the determined controls are proposed.

In some embodiments, the domain ontology is continuously improved. For example, if no topics are identified for a given n-gram but the n-gram appears to be related to the domain, an addition to the ontology based on the n-gram may be proposed. If the proposal is declined, some embodiments allow the addition of the n-gram to an exclusion list which prevents future proposals based on the n-gram.

Figure 1:
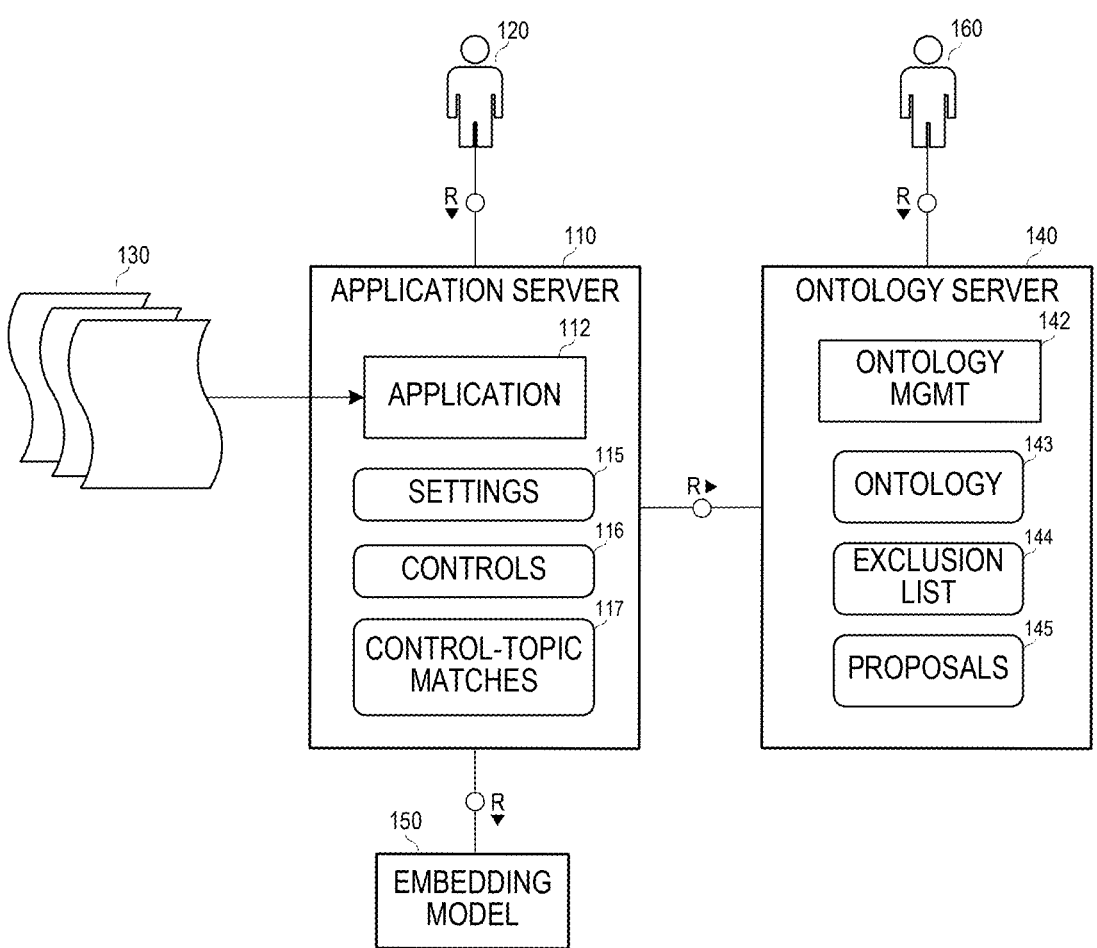
FIG. 1 is a block diagram of an architecture to perform domain-specific identification and mapping according to some embodiments.

FIG. 1 is a block diagram of an architecture to perform domain-specific identification and mapping according to some embodiments. Each of the illustrated components may be implemented using any suitable combination of on-premise, cloud-based, distributed (e.g., including distributed storage and/or compute nodes) computing hardware and/or software that is or becomes known. Each computing system described herein may comprise one or more physical and/or virtualized servers.

Two or more components of FIG. 1 may be co-located. In some embodiments, two or more components are implemented by a single computing device. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Application server 110 may comprise one or more servers, virtual machines, clusters of a container orchestration system, etc. Application server 110 may provide an operating system, services, I/O, storage, libraries, frameworks, etc. to applications executing therein.

Application 112 may comprise program code executable by a processing unit of application server 110 to provide functions to users such as user 120. Application server 110 also stores settings 115, controls 116 and control-topic matches 117, the functions of which will be described below. Application 112 may acquire data from and/or store data to one or more data storage devices as is known in the art. Such devices may be partially or fully remote from application server 110, and may be distributed as is known in the art. The data may comprise tabular data stored in a columnar or row-based format, object data or any other type of data that is or becomes known.

Application server 110 may receive documents 130 from any one or more sources. Each document 130 may, in some embodiments, include text descriptions of one or more requirements. The requirements may be requirements intended to enhance computer security, but embodiments are not limited thereto. A document 130 may be received from an external source (e.g., a customer, a certification authority) or from a source internal to an organization operating server 110. According to some embodiments, a document 130 may describe requirements that must be fulfilled in order to receive a particular compliance certification.

Ontology server 140 may be used to manage one or more domain ontologies according to some embodiments. Ontology server 140 includes program code of ontology management application 142, ontology 143, exclusion list 144 and proposals 145. An ontology according to some embodiments may include issues, or topics, associated with a particular domain and zero or more variant descriptions of each topic. Ontology 143 may include more than one ontology in some embodiments. The components of ontology server 140 may be provided by application server 110 in some embodiments.

Application 112 may use embeddings to determine text matches in some embodiments. For example, application 112 may transmit text to embedding model 150 which generates an embedding (i.e., a multi-dimensional numerical vector representing the metadata) intended to capture the semantic and syntactic meaning of the text. Application 112 may compare the generated embedding with an embedding generated from other text to determine a similarity between the two texts. Embedding model 150 may be implemented by executable program code, a set of hyperparameters defining a model structure and a set of corresponding weights, or any other representation of an input-to-output mapping.

According to some embodiments, user 120 interacts with application 112 (e.g., via a Web browser executing a front-end UI application associated with application 112) to issue a request specifying one or more of documents 130. Documents 130 may include text associated with one or more computer security requirements. Embodiments are not limited to any particular types of requirements. Documents 130 may comprise any one or more types of data structures, including but not limited to a Web page, a PDF document, and an e-mail.

The request may comprise a request to identify one or more controls 116 which may correspond to the requirements of selected documents 130. A control 116 is a description of a policy, protocol, process, etc. A control 116 corresponds to a requirement if the control 116 satisfies or otherwise addresses the requirement. For example, in the case of the following requirement: "Ensure that security policies and operational procedures for managing firewalls are documented, in use, and known to all affected parties", a corresponding control 116 may be "Our Security Policy and Security Standards are posted on our intranet and thus made available to employees and external users."

In response to the request, and as will be described in detail below, application 112 may identify a requirement of selected documents 130 and generate an array of n-grams therefrom. Next, using settings 115 and embedding model 150, application 112 compares each n-gram to the entities of ontology 143 to identify any matching topics of ontology 143. Each of controls 116 is similarly decomposed into n-grams which are used to identify matching topics of ontology 143. According to some embodiments, the controls and their matching topics are pre-determined and identified in control-topic matches 117. Those controls 116 which match the same topics as the requirement are identified and presented to user 120.

In some embodiments, an n-gram of a requirement which does not match any topics of ontology 143 may be determined to have semantic meaning which might relate to the domain of ontology 143. Such an n-gram may be stored in proposals 145 if it is not already present in exclusion list 144. Administrator 160 may periodically review proposals 145 to determine whether additional topics and/or topic variants should be added to ontology 143 based on proposals 145. If administrator 160 determines to not add a proposed n-gram to ontology 143, the n-gram may be added to exclusion list 144 so that it will not be proposed in the future.

Figure 2A:
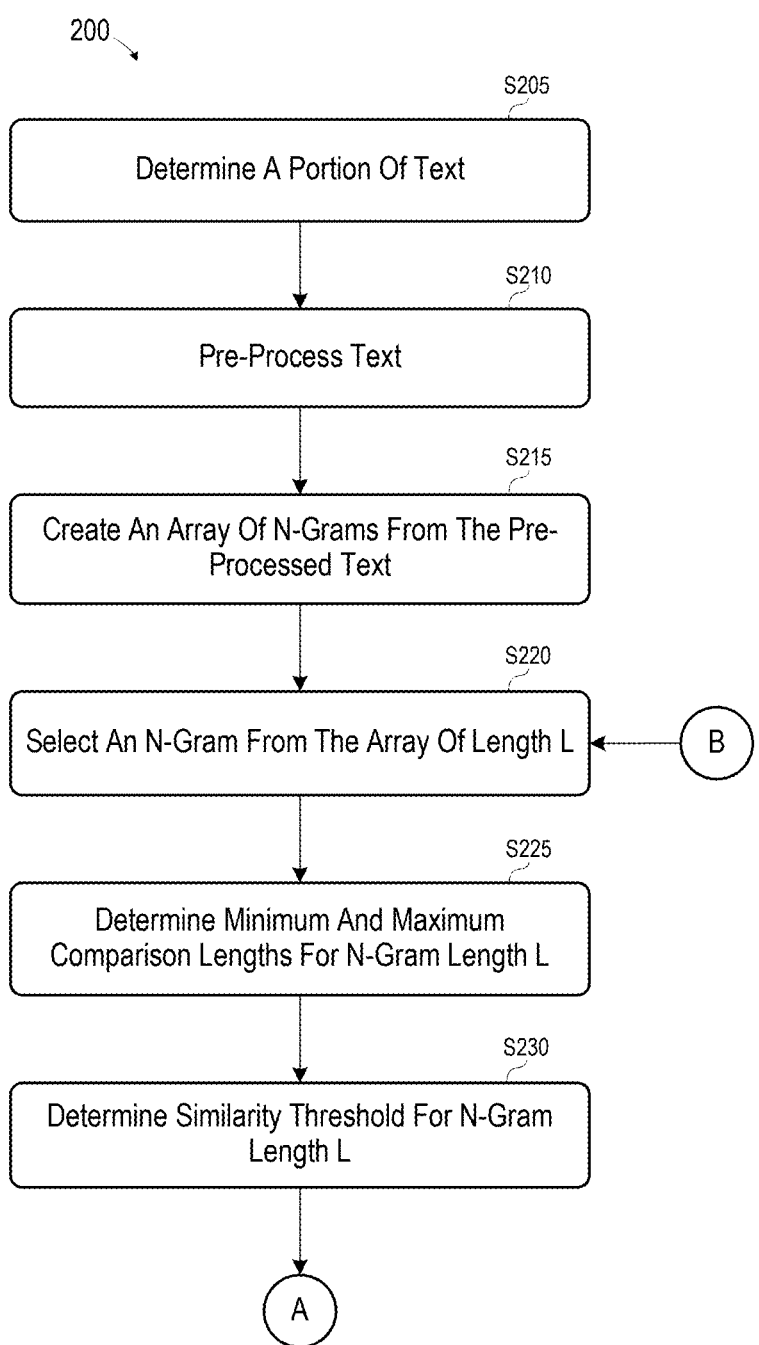
FIGS. 2A and 2B comprise a flow diagram of a process to perform domain-specific identification and mapping according to some embodiments.
Figure 2B:
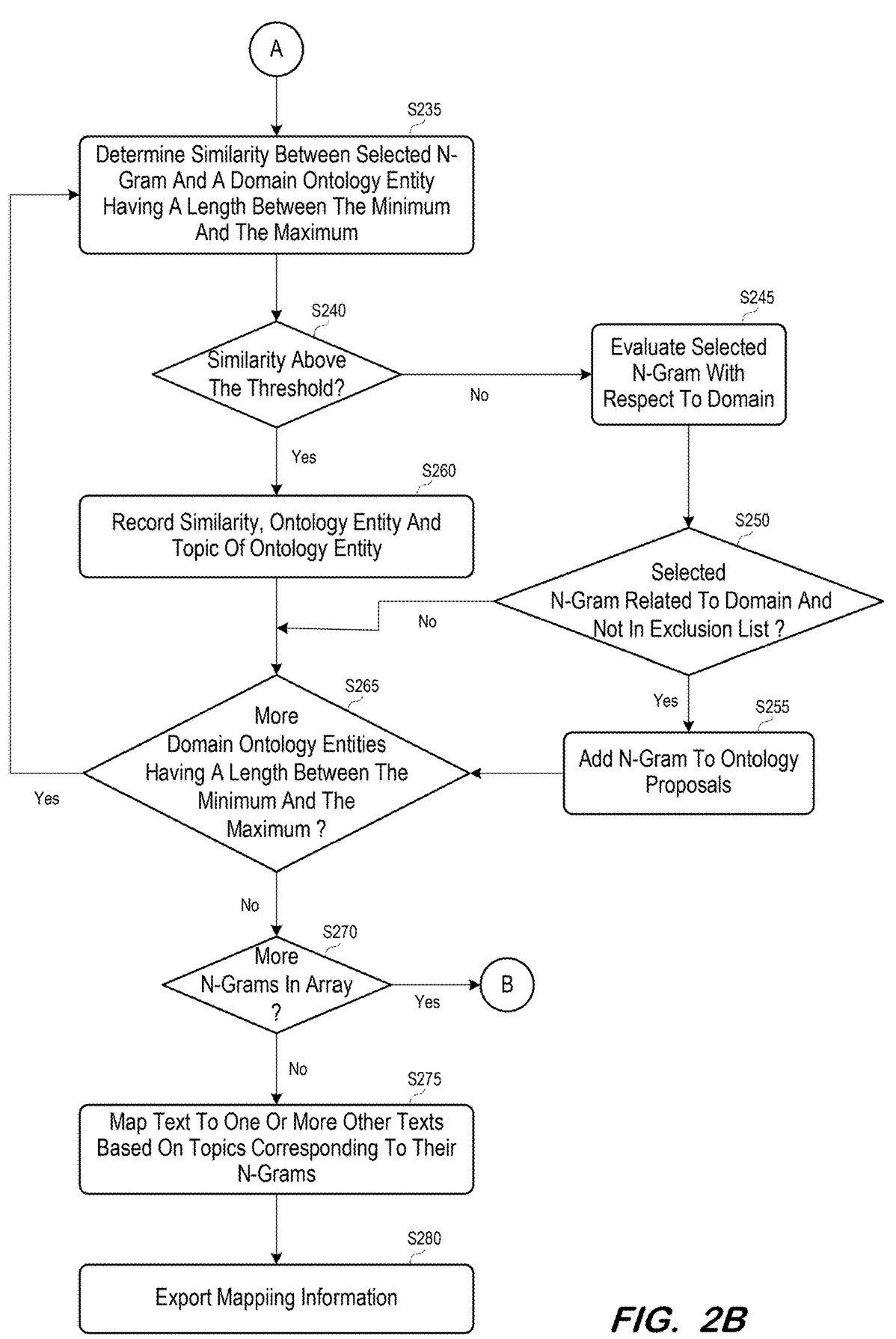

FIGS. 2A and 2B comprise a flow diagram of process 200 to perform domain-specific identification and mapping according to some embodiments. Process 200 and the other processes described herein may be performed using any suitable combination of hardware and software. Program code embodying these processes may be stored by any one or more non-transitory tangible media, including a fixed disk, a volatile or non-volatile random-access memory, a DVD, a Flash drive, or a magnetic tape, and executed by any one or more processing units, including but not limited to a processor, a processor core, and a processor thread. Embodiments are not limited to the examples described below.

Initially, a portion of text is determined at S205. The portion of text may be determined from one or more imported files, where each imported file includes sections representing a requirement or other text statement. An array of text portions may be extracted from the sectioned files, and one of these portions may be determined at S205.

Figure 3:
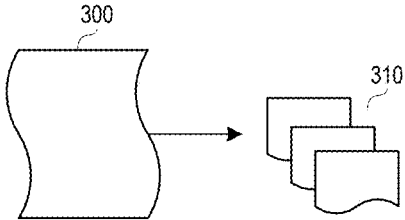
FIG. 3 illustrates determination of requirements according to some embodiments.
Figure 4:
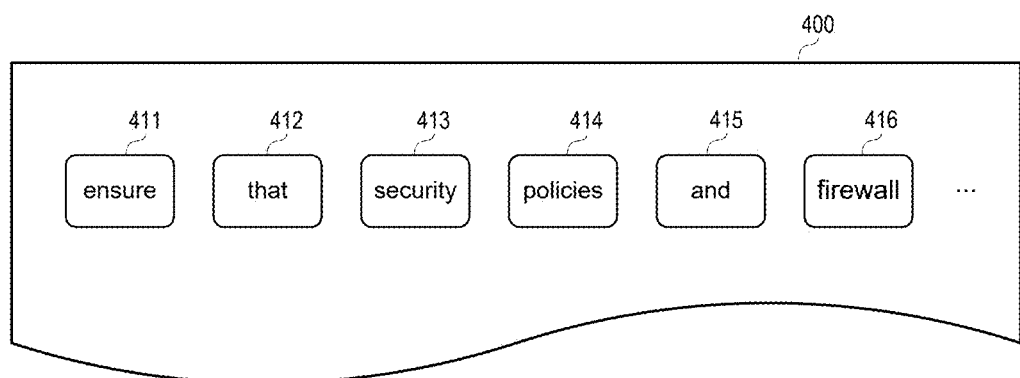
FIG. 4 illustrates a text portion according to some embodiments.

FIG. 3 illustrates one embodiment of S205, in which text portions 310 are parsed from input document 300. It will be assumed that each of text portions 310 includes a single text requirement and one of text portions 310 is determined at S205. FIG. 4 illustrates text portion 400 determined at S205 according to some embodiments. Text portion 400 includes words 411 through 416 as well as other unshown words.

Figure 5:
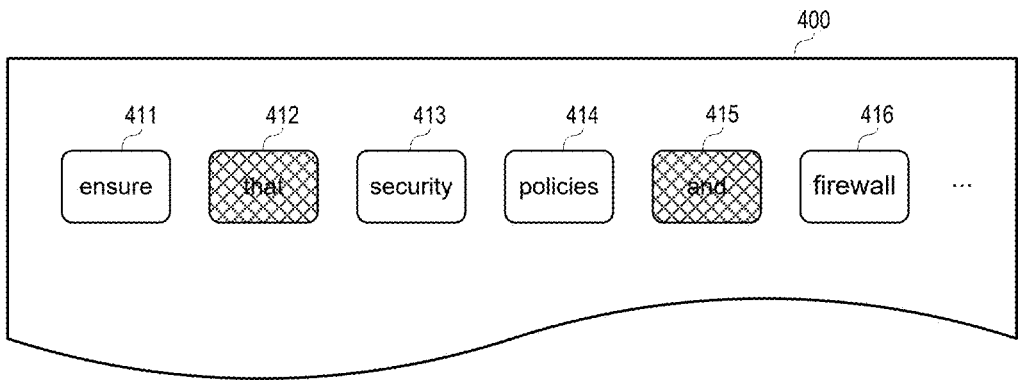
FIG. 5 illustrates a parsed text portion according to some embodiments.

The text portion is subjected to pre-processing at S210. As is known in the art, pre-processing may include tokenization, lemmatization, stop word removal or other common methods to prepare text for automated processing. FIG. 5 illustrates results of the pre-processing according to some embodiments. In particular, words 412 and 415 have been removed from text portion 400.

Figure 6:
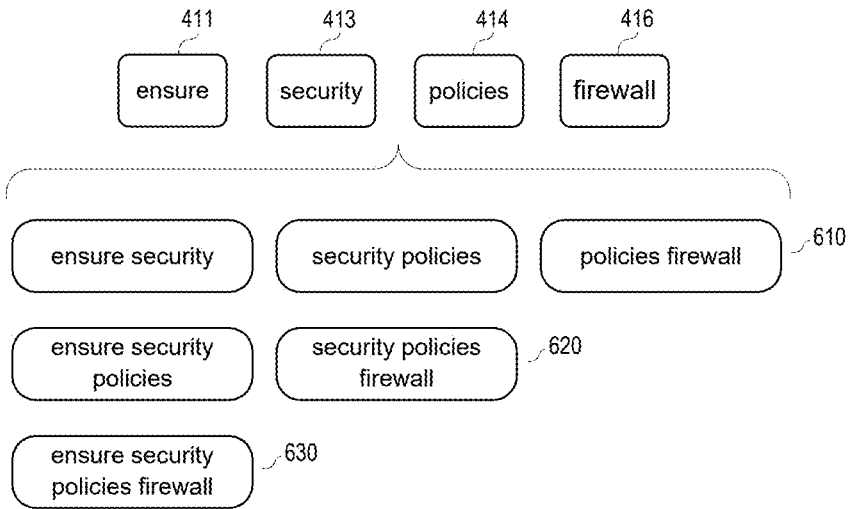
FIG. 6 illustrates generation of n-grams according to some embodiments.

Next, at S215, an array of n-grams is created from the pre-processed text. According to some embodiments, each word (or other type of string) of the pre-processed text is decomposed into its n-grams. A minimum and/or a maximum n-gram length, such as 2 and 10, may be specified in settings 115. In the present example, words 411, 413, 414, 416 and any other remaining words of text portion 400 are decomposed into n-grams. FIG. 6 illustrates the decomposition of words 411, 413, 414, 416 into n-grams 610-630, with a minimum n-gram length of 2.

A first n-gram of the array of n-grams is selected at S220. The selected n-gram may be composed of any number of words. At S225, minimum and maximum comparison lengths are determined based on the length of the selected n-gram. The minimum and maximum comparison lengths determine the ontology entities with which the selected n-gram will be compared. Specifically, the selected n-gram will be compared only with ontology entities of a length greater than or equal to the minimum comparison length and less than or equal to the maximum comparison length.

Figure 7:
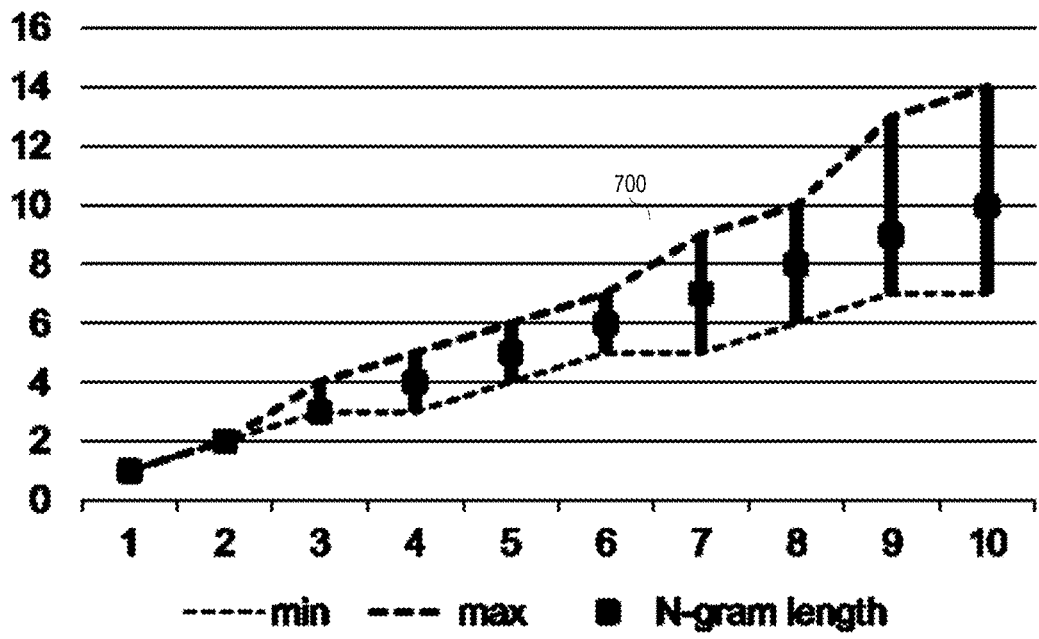
FIG. 7 illustrates minimum and maximum comparison lengths for different n-gram lengths according to some embodiments.

The minimum and maximum comparison lengths corresponding to various n-gram lengths may be stored in and determined from settings 115. FIG. 7 illustrates graph 700 of minimum and maximum comparison lengths corresponding to various n-gram lengths. As shown, the minimum and maximum comparison lengths for selected n-grams of word length 1 (i.e., uni-grams) are 1 and 1, respectively, the minimum and maximum comparison lengths for selected n-grams of word length 2 (i.e., bi-grams) are 2 and 2, respectively, and the minimum and maximum comparison lengths for selected n-grams of word length 3 (i.e., tri-grams) are 3 and 4, respectively. The minimum and maximum comparison lengths for selected n-grams of word length 4 are 3 and 5, respectively, the minimum and maximum comparison lengths for selected n-grams of word length 7 are 5 and 9, respectively, and the minimum and maximum comparison lengths for selected n-grams of word length 9 are 7 and 13, respectively. Accordingly, the range of comparison lengths may differ between the n-gram lengths and may be asymmetrical about an n-gram length.

Figure 8:
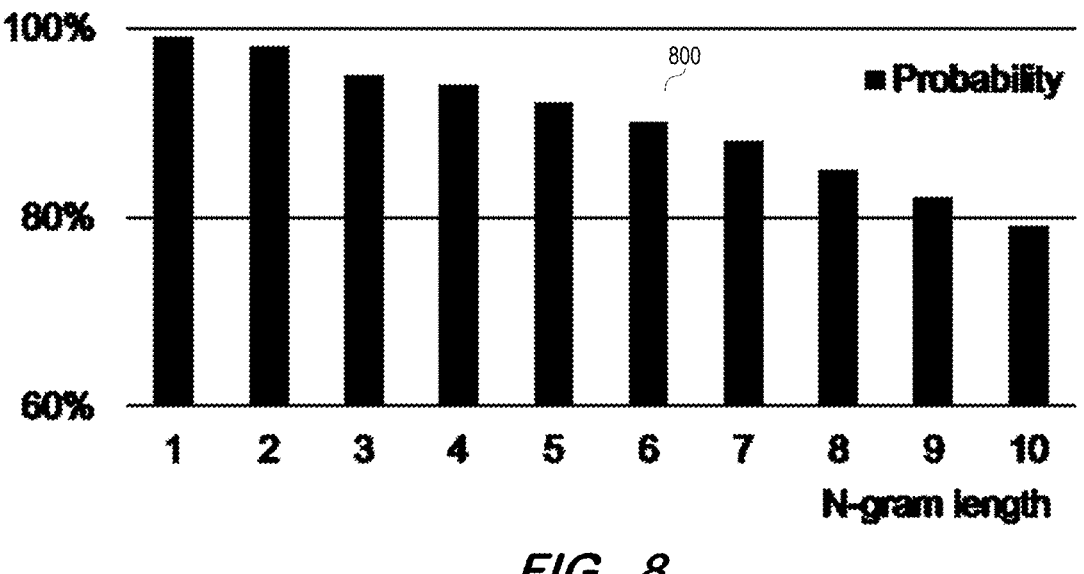
FIG. 8 illustrates threshold matching probabilities for different n-gram lengths according to some embodiments.

Next, at S230, a similarity threshold is determined based on the length of the n-gram selected at S220. The similarity threshold indicates a value of a similarity metric which must be met or exceeded to determine that the selected n-gram matches a given ontology entity. Graph 800 of FIG. 8 illustrates a case in which the similarity metric is a matching probability computed by a matching algorithm, and the similarity threshold applicable to a given n-gram depends on the word length of the selected n-gram.

In the case of graph 800, the threshold is inversely related to the n-gram length. For example, to determine that an n-gram of length 2 matches an ontology entity, the matching algorithm must predict an almost 100% probability that the n-gram matches the ontology entity. However, to determine that an n-gram of length 10 matches an ontology entity, the threshold is less than 80%.

At S235, the similarity between the selected n-gram and a selected entity of a domain ontology is determined. As mentioned above, the selected entity of the domain ontology must consist of a number of a words between the minimum and maximum word lengths determined for the selected n-gram at S225.

Figure 9:
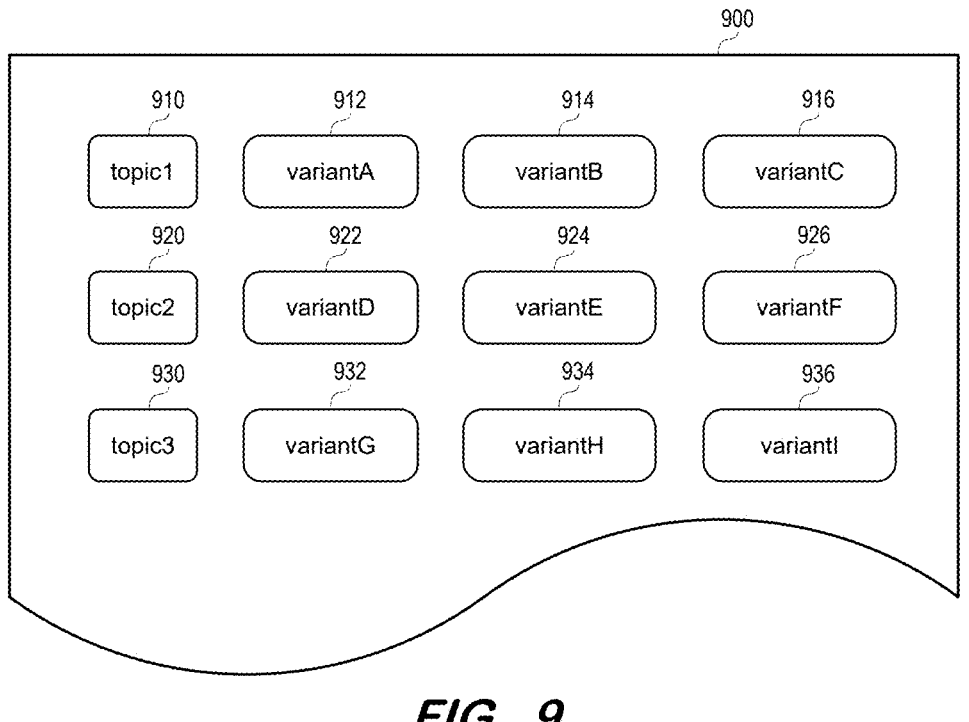
FIG. 9 illustrates a domain ontology according to some embodiments.

FIG. 9 illustrates ontology 900 according to some embodiments. Ontology 900 includes entities 910 through 936. The entities of ontology 900 may be associated with any one or more knowledge domains that are or become known. In one non-exhaustive example, the entities of ontology 900 may be associated with the domain of Security & Privacy Governance.

The entities of ontology 900 include topics 910, 920 and 930. Each of topics 910, 920 and 930 may be represented by a string of text. For example, topic 910 may consist of "Security & Privacy Governance Program" and topic 920 may consist of "Publishing Security Policies".

The entities of ontology 900 also include topic variants. Each topic of an ontology may be associated with zero or more variants. A variant may comprise an alternative description of the topic, additional information relating to the topic, or any other string of text related to the topic. In the example of FIG. 9, topic 910 is associated with variants 912, 914 and 916, topic 920 is associated with variants 922, 924 and 926, and topic 930 is associated with variants 932, 934 and 936. Continuing the present example, variants 912, 914 and 916 may consist of "security governance program", "privacy governance program", and "security and privacy governance", respectively.

Returning to S235, a similarity between the currently-selected n-gram and the selected ontology entity may be determined based on a vector comparison. For example, a first multi-dimensional vector may be generated based on the n-gram and a second multi-dimensional vector may be generated based on the selected ontology entity. According to some embodiments, an embedding model is used to generate the above-described multi-dimensional vectors. As is known in the art, the embedding model may be trained to generate a numerical multi-dimensional vector based on input text. The model is trained such that the vectors generated from two input texts having similar semantic meaning are close to one another in multi-dimensional space and the vectors generated from two input texts having dissimilar semantic meaning are further from one another in multi-dimensional space.

The similarity between the n-gram and the entity may be determined using any vector comparison metric, such as but not limited to the absolute value of a distance therebetween. Embodiments may employ any other systems for determining a similarity between an n-gram and an ontology entity. The similarity may be determined as a likelihood of a match between the n-gram and an ontology entity, for example.

At S240, it is determined whether the determined similarity is above the similarity threshold determined at S230. If not, flow proceeds to S245 to evaluate the n-gram with respect to the domain. S245 may include any suitable steps for determining whether the n-gram is likely related to the domain of the ontology. In some embodiments, the n-gram is compared with a text corpus associated with the domain to determine whether the semantic meaning of the n-gram might belong to the domain.

At S250, it is then determined whether the semantic meaning of the n-gram might belong to the domain, and whether the n-gram is not in an exclusion list (e.g., a list of n-grams which are not to be added to the domain). If so, the n-gram and any findings of S245 are added to a list of ontology proposals at S255. As described above, an administrator may review the list from time-to-time to determine whether to add topics and/or variants related to the proposed n-grams to the ontology, and to provide instructions to add topics and/or variants related to the proposed n-grams to the ontology. Flow then proceeds to S265. Flow proceeds directly from S250 to S265 if the semantic meaning of the n-gram is not likely to belong to the domain and/or the n-gram is in the exclusion list.

Returning to S240, it is now assumed that the determined similarity is above the threshold. Accordingly, the similarity, the ontology entity and, if the ontology entity is a topic variant, the topic of the ontology entity are recorded at S260. FIG. 10 illustrates records 1000 generated at S260 according to some embodiments. Each record is generated during a respective iteration of S260, and includes an n-gram, the matching topic and variant, and a value of the similarity metric.

At S265, it is determined whether the ontology includes other entities having a number of words between the minimum and maximum word lengths determined for the current n-gram. If so, flow returns to S235 to determine a similarity between the n-gram and another ontology entity of a suitable length. Flow then proceeds as described above to either record the similarity, the ontology entity, and the topic of the ontology entity, to add the n-gram to a list of ontology proposals, or to return to S265 directly from S250. Flow continues in this manner until it is determined at S265 that all ontology entities between the minimum and maximum word lengths determined for the current n-gram have been analyzed.

At S270, it is determined whether the array of n-grams created at S215 includes additional n-grams to be compared with the ontology entities. If so, flow returns to S220 to select the next n-gram from the array. Flow then continues as described above to determine a minimum length, a maximum length, and a similarity threshold based on a length of the now-selected n-gram, and to compare the n-gram to all ontology entities of a suitable length. This process may result in the addition of records to records 1000, which specify the now-selected n-gram.

The n-grams of the pre-processed text portion are analyzed in this manner until it is determined at S270 that no n-grams remain to be analyzed. At S275, the portion of text determined at S205 is mapped to one or more other texts based on topics corresponding to their respective n-grams. The mapping at S275 may simply identify texts which include n-grams that are associated with at least one topic that is identical to a topic associated with an n-gram of the text portion. S275 assumes that S205 through S270 has been applied to other texts, resulting in the determination of domain ontology topics which are associated with n-grams of the other texts. For example, S205 through S270 may have been previously applied to each of a set of controls 116 as described above.

Records 1100 of FIG. 11 illustrate information recorded at S260 during processing of one control 116 by process 200 according to some embodiments. As shown, the n-gram "secure policy" of the control text is associated with the same topic (i.e., Topic2) and the same variant (i.e., VariantE) as the n-gram "security policies" of the requirement text represented by records 1000 of FIG. 10. The n-gram "firewall access" of the control text is associated with the same topic (i.e., Topic1) as the n-gram "policies firewall" of the requirement text although with a different variant (i.e., VariantB). Accordingly, the control 116 may be mapped to the requirement text at S275.

The mapping at S275 may consider any suitable factors. For example, determination of a mapping between a requirement text and a control text may be based on the number of common matching topics, the number of common matching topic/variant combinations, the match probabilities associated with the matching common matching topics and/or the common matching topic/variant combinations, etc.

Mapping information is exported at S280. A user may use the mapping information to facilitate the identification of controls which address a requirement represented by the portion of text determined at S205.

FIG. 12 illustrates user interface 1200 of a compliance application according to some embodiments. In one example, user 120 executes a Web browser to access application 112 and to communicate with application 112 to select a requirement and a domain ontology. Application 112 executes process 200 to determine mappings and between the requirement and controls and generates user interface 1200 to present the determined mapping information.

User interface 1200 presents requirement 1210 and control IDs 1220 which identify matching control text. Also shown are, for each control, topics 1230 which match both requirement 1210 and the control, as well as matching score 1240. Matching score 1240 may be calculated using any suitable algorithm. For example, the matching score for a given control may be determined based on the number of common matching topics, the number of common matching topic/variant combinations, the match probabilities associated with the matching common matching topics and/or the common matching topic/variant combination.

User interface 1200 also includes selection boxes 1250. The user may select a box 1250 of a row to associate the requirement with the control of the row. This selection may be recorded in a compliance report which demonstrates how the organization complies with one or more requirements.

Embodiments may significantly decrease efforts related to manual information mapping and the validation of mapping quality and enable use cases which are not currently feasible due to resource consumption limitations. Embodiments advantageously offer various matching options and statistics, based on which a user can evaluate the relevancies of the proposed mappings. Furthermore, embodiments support guided continuous improvement of domain-specific ontologies, which may improve performance and eventually allow in completely automated processing.

Figure 13:
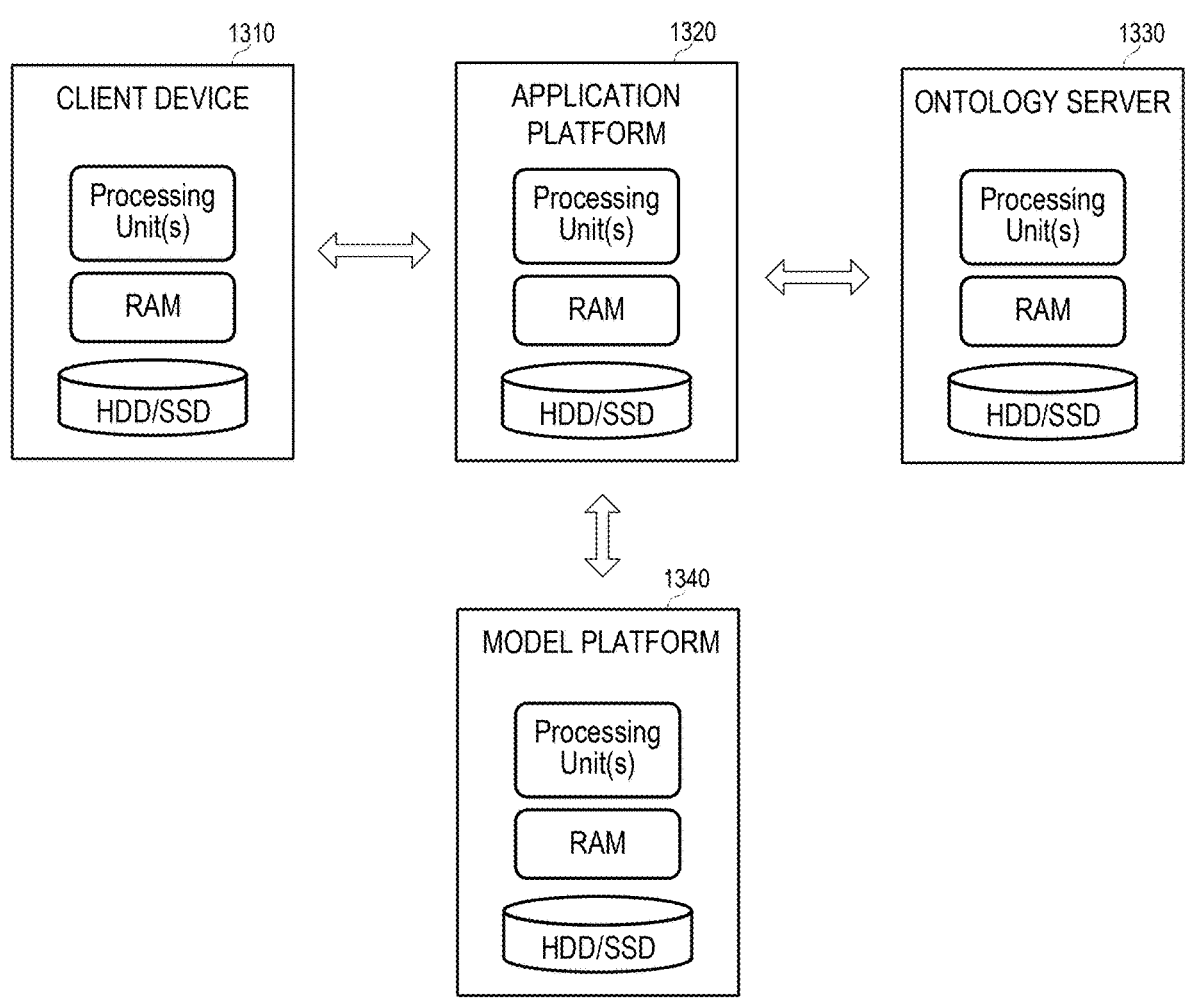
FIG. 13 illustrates a hardware architecture according to some embodiments.

FIG. 13 is a block diagram of a hardware architecture according to some embodiments. Application platform 1320, ontology server 1330 and model platform 1340 may each comprise cloud-based resources, such as virtual machines, allocated by a cloud provider providing self-service and immediate provisioning, autoscaling, security, compliance, and identity management features.

Client device 1310 may interact with a user interface of an application executing on application platform 1320, for example via a Web browser executing on user device 1310. The user interface may allow selection of a requirement and a domain. Application platform 1320 may determine mappings between the requirement and controls based on an ontology of the domain stored in ontology server 1330 and similarities determined based on embeddings received from an embedding model of model platform 1340. Application platform 1320 may return corresponding mapping information to client device 1310 for use thereby.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processing unit to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

a memory storing program code; and one or more processing units to execute the program code to cause the system to:

for each of a plurality of text portions:

generate n-grams of different lengths from words of the text portion;

for each of a plurality of the n-grams, determine one or more matching topic variants of a domain ontology; and determine a topic associated with each of the one or more matching topic variants;

determine a first text portion;

generate first n-grams of different lengths from words of the first text portion;

for each of a plurality of the first n-grams, determine a first one or more matching topic variants of the domain ontology by:

determination of a first minimum word length and a first maximum word length associated with a first word length of a first one of the plurality of the first n-grams;

determination of a second minimum word length and a second maximum word length associated with a second word length of a second one of the plurality of the first n-grams;

comparison of the first one of the plurality of the first n-grams with first words of topic variants of the domain ontology having a word length between the first minimum word length and the first maximum word length; and comparison of the second one of the plurality of the first n-grams with second words of topic variants of the domain ontology having a word length between the second minimum word length and the second maximum word length;

determine a first topic associated with each of the first one or more matching topic variants;

determine a mapping between the first text portion and one or more of the plurality of text portions based on the determined topics and the determined first topics; and present the mapping.

2. The system of claim 1, wherein a difference between the first minimum word length and the first word length is not equal to a difference between the first maximum word length and the first word length.

3. The system of claim 1, wherein determination of the first one or more matching topic variants of a domain ontology for each of the plurality of the first n-grams comprises:

determination of a first similarity threshold associated with the first word length of the first one of the plurality of the first n-grams;

determination of a second similarity threshold associated with the second word length of the second one of the plurality of the first n-grams;

determination that a first similarity between the first one of the plurality of the first n-grams and a first topic variant of the domain ontology is greater than the first similarity threshold; and determination that a second similarity between the second one of the plurality of the first n-grams and a second topic variant of the domain ontology is greater than the second similarity threshold.

4. The system of claim 1, the one or more processing units to execute the program code to cause the system to:

determine that one of the first n-grams does not match any topic variants of the domain ontology;

perform semantical analysis on the one of the first n-grams to determine a likelihood that the one of the first n-grams is related to the domain ontology;

determine that the likelihood is greater that a threshold;

in response to the determination that the likelihood is greater that the threshold, present the one of the first n-grams; and receive an instruction to add the one of the first n-grams to the domain ontology.

5. The system of claim 4, the one or more processing units to execute the program code to cause the system to:

prior to presentation of the one of the first n-grams, determine that the one of the first n-grams is not in an exclusion list.

6. The system of claim 5, the one or more processing units to execute the program code to cause the system to:

determine that a second one of the first n-grams does not match any topic variants of the domain ontology;

perform semantical analysis on the second one of the first n-grams to determine a second likelihood that the second one of the first n-grams is related to the domain ontology;

determine that the second likelihood is greater that the threshold;

in response to the determination that the second likelihood is greater that the threshold, present the second one of the first n-grams;

receive a second instruction to not add the second one of the first n-grams to the domain ontology; and in response to the second instruction, add the second one of the first n-grams to the exclusion list.

7. A method comprising:

generating a set of n-grams of different word lengths from each of a plurality of text portions;

for each set of n-grams, determining one or more matching topic variants of a domain ontology;

determining a topic associated with each of the one or more matching topic variants, wherein a determined topic is associated with the text portion from which n-grams matching an associated topic variant were generated;

determining a first text portion;

generating first n-grams of different lengths from the first text portion;

for each of a plurality of the first n-grams, determining a first one or more matching topic variants of the domain ontology by:

determining a first minimum word length and a first maximum word length associated with a first word length of a first one of the plurality of the first n-grams;

determining a second minimum word length and a second maximum word length associated with a second word length of a second one of the plurality of the first n-grams;

comparing the first one of the plurality of the first n-grams with first words of topic variants of the domain ontology having a word length between the first minimum word length and the first maximum word length; and comparing the second one of the plurality of the first n-grams with second words of topic variants of the domain ontology having a word length between the second minimum word length and the second maximum word length;

determining a first topic associated with each of the first one or more matching topic variants;

determining a mapping between the first text portion and one or more of the plurality of text portions based on the topics associated with the plurality of text portions and the determined first topics; and presenting the mapping.

8. The method of claim 7, wherein a difference between the first minimum word length and the first word length is not equal to a difference between the first maximum word length and the first word length.

9. The method of claim 7, wherein determining the first one or more matching topic variants of a domain ontology for each of the plurality of the first n-grams comprises:

determining a first similarity threshold associated with the first word length of the first one of the plurality of the first n-grams;

determining a second similarity threshold associated with the second word length of the second one of the plurality of the first n-grams;

determining that a first similarity between the first one of the plurality of the first n-grams and a first topic variant of the domain ontology is greater than the first similarity threshold; and determining that a second similarity between the second one of the plurality of the first n-grams and a second topic variant of the domain ontology is greater than the second similarity threshold.

10. The method of claim 7, further comprising:
determining that one of the first n-grams does not match any topic variants of the domain ontology;
performing semantical analysis on the one of the first n-grams to determine a likelihood that the one of the first n-grams is related to the domain ontology;
determining that the likelihood is greater that a threshold;
in response to determining that the likelihood is greater that the threshold, presenting the one of the first n-grams; and
receiving an instruction to add the presented one of the first n-grams to the domain ontology.

11. The method of claim 10, further comprising:
prior to presenting the one of the first n-grams, determining that the one of the first n-grams is not in an exclusion list.

12. The method of claim 11, further comprising:
determining that a second one of the first n-grams does not match any topic variants of the domain ontology;
performing semantical analysis on the second one of the first n-grams to determine a second likelihood that the second one of the first n-grams is related to the domain ontology;
determining that the second likelihood is greater that the threshold;
in response to determining that the second likelihood is greater that the threshold, presenting the second one of the first n-grams;
receiving a second instruction to not add the second one of the first n-grams to the domain ontology; and
in response to the second instruction, adding the second one of the first n-grams to the exclusion list.

13. One or more non-transitory media storing program code executable by one or more processing units of a computing system to cause the computing system to:
generate a set of n-grams of different lengths from each of a plurality of text portions;
for each set of n-grams, determine one or more matching topic variants of a domain ontology;
determine a topic associated with each of the one or more matching topic variants, wherein a determined topic is associated with the text portion from which n-grams matching an associated topic variant were generated;

generate first n-grams of different lengths from a first text portion;
for each of a plurality of the first n-grams, determine a first one or more matching topic variants of the domain ontology by:
determination of a first minimum word length and a first maximum word length associated with a first word length of a first one of the plurality of the first n-grams;
determination of a second minimum word length and a second maximum word length associated with a second word length of a second one of the plurality of the first n-grams;
comparison of the first one of the plurality of the first n-grams with first words of topic variants of the domain ontology having a word length between the first minimum word length and the first maximum word length;
comparison of the second one of the plurality of the first n-grams with second words of topic variants of the domain ontology having a word length between the second minimum word length and the second maximum word length;
determination of a first similarity threshold associated with the first word length of the first one of the plurality of the first n-grams;
determination of a second similarity threshold associated with the second word length of the second one of the plurality of the first n-grams;
determination that a first similarity between the first one of the plurality of the first n-grams and a first topic variant of the domain ontology is greater than the first similarity threshold; and
determination that a second similarity between the second one of the plurality of the first n-grams and a second topic variant of the domain ontology is greater than the second similarity threshold;
determine a first topic associated with each of the first one or more matching topic variants;
determine a mapping between the first text portion and one or more of the plurality of text portions based on the topics associated with the plurality of text portions and the determined first topics; and
present the mapping.

* * * * *